United States Patent [19]

Martin

[11] Patent Number: 4,972,048

[45] Date of Patent: Nov. 20, 1990

[54] FLEXIBLE HOUSING FOR A TRANSMISSION LINE IN A HYDROSTATICALLY PRESSURIZED ENVIRONMENT

[75] Inventor: James D. S. Martin, Dundee, Scotland

[73] Assignee: W. L. Gore & Associates, Inc., Newark, Del.

[21] Appl. No.: 362,212

[22] Filed: Jun. 6, 1989

[30] Foreign Application Priority Data

Jun. 6, 1988 [GB] United Kingdom ............... 8813365

[51] Int. Cl.⁵ .......................... H02G 3/04; H01B 7/24
[52] U.S. Cl. .................................. 174/136; 138/120; 174/68.3; 174/111
[58] Field of Search ...................... 174/68.3, 111, 136, 174/167; 59/78.1; 138/110, 120, 155; 191/12 C

[56] References Cited

U.S. PATENT DOCUMENTS

| | | | |
|---|---|---|---|
| 421,781 | 2/1890 | Stoughton | 174/111 |
| 3,060,972 | 10/1962 | Sheldon | 174/111 X |

*Primary Examiner*—Laramie E. Askin
*Attorney, Agent, or Firm*—Mortenson & Uebler

[57] ABSTRACT

A flexible housing for use in protecting one or more transmission lines in a pressurized environment is provided comprising a conduit contained within a protective outer jacket. The conduit is constructed of a plurality of conduit segments, each segment having an opening therethrough, the segments being arranged in series and caused to abut adjacent segments in such a way that the opening through each segment is in communication with the openings through each of the adjacent segments so as to provide a passage to contain a transmission line. Each segment is flexibly linked to its adjacent segments by coupling means.

11 Claims, 2 Drawing Sheets

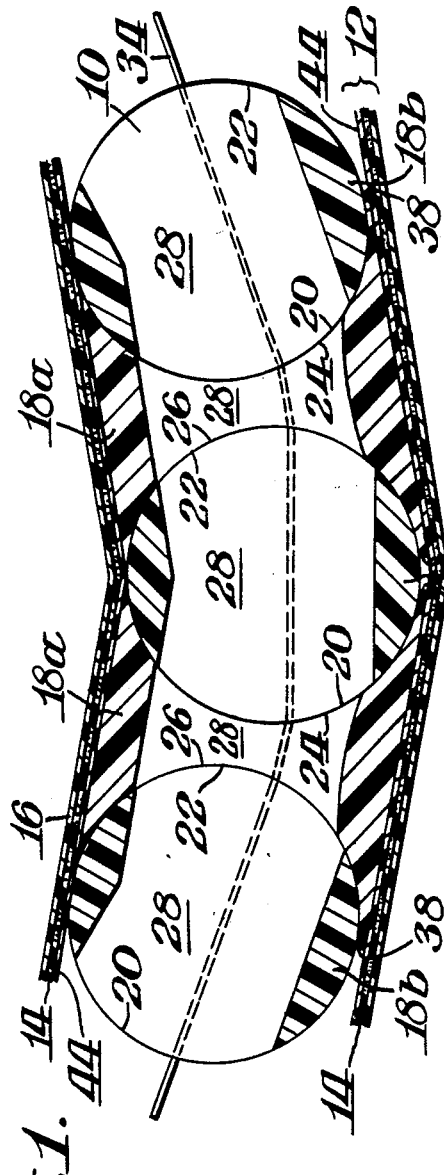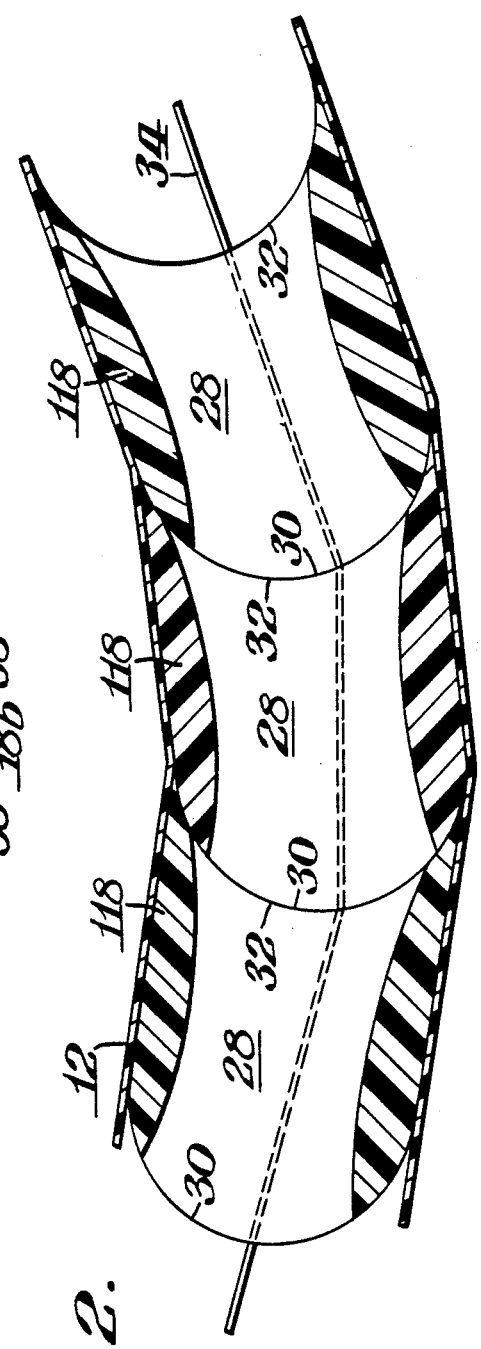

FLEXIBLE HOUSING FOR A TRANSMISSION LINE IN A HYDROSTATICALLY PRESSURIZED ENVIRONMENT

BACKGROUND OF THE INVENTION

1. Field of the invention

The present invention relates to a flexible housing for use in protecting one or more transmission lines, particularly microwave transmission lines, in a pressurized environment and, in particular, a hydrostatically pressurized environment.

2. Description of Related Art

The invention originates from a requirement for a microwave transmission line to operate within a submarine mast environment. Modern submarine mast design dictates the placement of electronic equipment in an electronics pod at the mast head connected by microwave transmission lines to processing equipment in the hull. This arrangement creates the requirement for a microwave transmission line capable of withstanding a hydrostatic pressure of up to 1000 psi ($6.89 \times 10^6$ Nm$^{-2}$) and yet be able to flex through an angle of 180° with a bend radius of 150 mm when the mast head is raised.

In the past, various "wet mast" techniques have involved the ruggedising of coaxial microwave cables so as to limit an acceptable level the amount of hydrostatic pressure felt by the cable. Often, under such pressure conditions, it is the dielectric within the coaxial cable that absorbs the bulk of the compressive forces, altering the microwave characteristics of the cable.

The use of a more rigid dielectric material to overcome the problem of compression under hydrostatic pressure has an adverse effect on cable performance. Furthermore, this technique limits the types of cable which can be used, their number and their application, and consequently, has a detrimental effect on the performance of the system as a whole.

The above technique also requires the use of some form of cable management system to ensure that the cables hang and remain in a defined position under the various dynamic conditions of the submarine. Each microwave transmission line linking the electronics pod at the mast head with the processing equipment in the hull will contain a flexure through 180°, the point of flexure being determined by the relative heights of the terminations of the transmission line; and the point of flexure will thus change as the mast is raised. The cable management system not only has to allow for the smooth change in position of the point of flexure, but also has to ensure that the transmission lines are unaffected by the angle of dive of the submarine, which may be of the order of ±10°, or the angle of tilt of the submarine caused by a surface swell and possibly of the order of ±30°.

The present invention is concerned with the provision of a barrier between a pressurized environment and a microwave transmission line thus enabling the use of cables selected for their microwave characteristics rather than their ability to withstand hydrostatic pressure. This is obviously beneficial to the performance of the system while the barrier, in the form of a flexible housing, enables the transmission line to withstand far greater hydrostatic pressures than heretofore. The design of the present invention also eliminates the need for a cable management system, thus simplifying the mast design.

SUMMARY OF THE INVENTION

According to the present invention, there is provided a flexible housing for use in protecting a transmission line in a pressurized environment, comprising a conduit contained within a protective outer jacket, the conduit being constructed of a plurality of segments, each conduit segment having an opening therethrough, the segments being arranged in series and caused to abut adjacent segments in such a way that the opening through each segment is in communication with the openings through each of the adjacent segments so as to provide a passage to contain a transmission line, each segment being flexibly linked to its adjacent segments by coupling means.

In a preferred embodiment of the present invention, there is further provided a flexible housing for use in protecting a transmission line in a pressurized environment comprising a conduit contained within encasing means, the conduit being constructed of a plurality of segments, each conduit segment being of one of two different configurations having an opening, flared at its opposite ends, therethrough, the segments being arranged in series and of alternate configuration so that the opening through each segment is in communication with the openings through each of the adjacent segments so as to provide a passage to contain a transmission line, the first configuration of conduit segment being of biconcave cross-section and the second configuration being of circular cross-section. The cross-sectional radius of the second configuration is substantially equal to that of the first configuration so that the second configuration may be received thereby, one of the configurations being provided with guide surfaces and the other configuration being provided with means to cooperate therewith to prevent relative lateral movement between adjacent segments. The adjacent segments are flexibly linked by a pair of flexible running throughout the length of the conduit and passing through each segment in a way as to define a place that does not contain the through axis of the opening in the segment so that a tension generated by the pair of ligaments acts at a distance away from the through axis. The encasing means comprises an inner sleeve and an outer protective jacket, the inner sleeve being provided between the conduit and the outer protective jacket and prevented from being pinched between adjacent conduit segments by means of a nylon strip running the length of the conduit.

Although the present invention originated from a consideration of the problems of microwave transmission in submarine mast design, protective flexible housings embodying the invention are equally suited to other applications wherein a connection is required within an environment that would be unsuitable for an otherwise unprotected transmission line. Similarly, even though the prior art has been discussed with reference to the use of coaxial cables, it is understood that this is in no way intended to limit the scope of the invention, the present invention being equally applicable to other transmission means.

BRIEF DESCRIPTION OF THE DRAWINGS

FIG. 1 is a cross-sectional view of part of a flexible housing embodying the invention.

FIG. 2 is a cross-sectional view of part of a flexible housing according to an embodiment of the invention.

Figure 3:
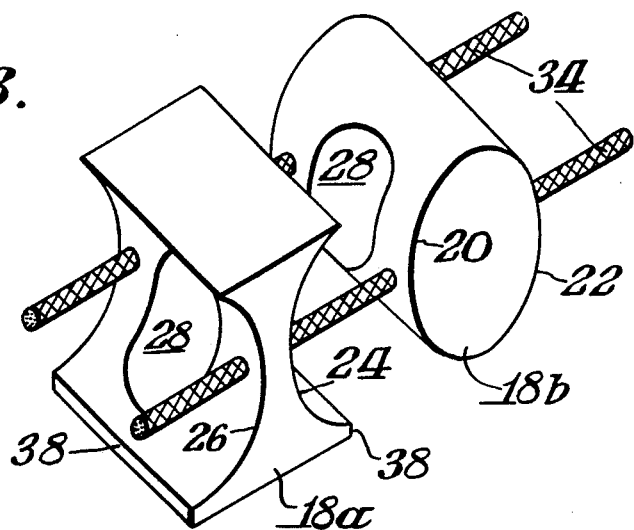
FIG. 3 is an exploded perspective view of two adjacent conduit segments according to an embodiment of the invention.
Figure 4:
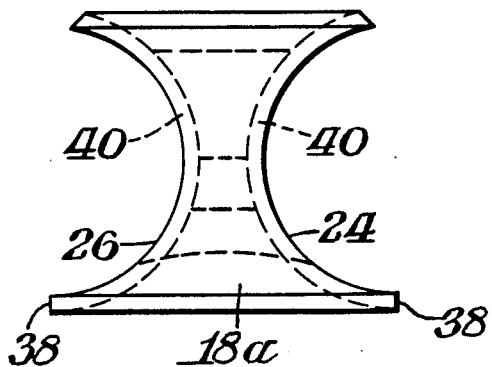
FIG. 4 is a lateral view of a conduit segment of biconcave cross-section according to an embodiment of the invention.
Figure 5:
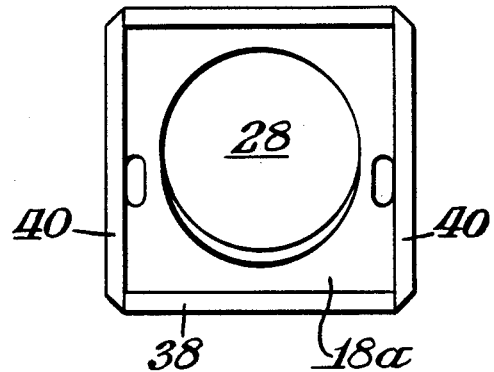
FIG. 5 is an axial view of the conduit segment of FIG. 4.
Figure 6:
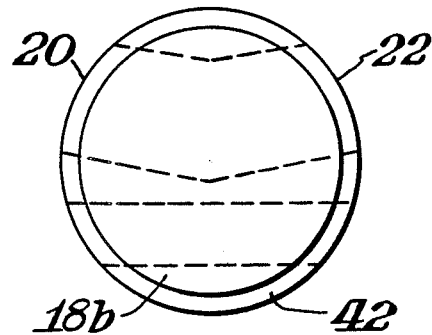
FIG. 6 is a lateral view of a conduit segment of circular cross-section according to an embodiment of the invention.
Figure 7:
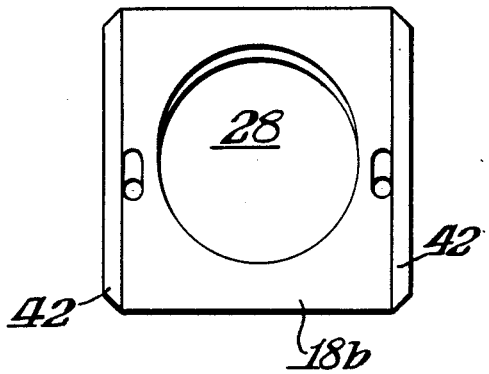
FIG. 7 is an axial view of the conduit segment of FIG. 6.

DETAILED DESCRIPTION OF THE INVENTION AND PREFERRED EMBODIMENTS WITH REFERENCE TO THE DRAWINGS

The flexible housing shown in FIG. 1 comprises a conduit 10 and encasing means 12, in turn comprising an inner sleeve 14 and a protective outer jacket 16 and a nylon strip 44. The conduit 10 is constructed of a plurality of conduit segments 18a and 18b, the number of segments being determined by the length of housing required, and in the embodiment shown the segments are of one of two configurations. The first configuration is that of conduit segment 18a which is of biconcave cross-section while the second configuration is that of conduit segment 18b which is of circular cross-section. The segments are arranged in series, the two configurations of conduit segments, 18a and 18b, alternating along the length of the conduit 10, and caused to abut adjacent segments. The cross-sectional radius of the second configuration of conduit segment 18b is of substantially similar value to the radius of curvature of the first configuration 18a so that the convex arcuate surfaces 20 and 22 of the second configuration of conduit segment 18b are received by the concave arcuate surfaces 24 and 26 of the adjacent segments of the first configuration 18a.

Each conduit segment, irrespective of configuration, has an opening 28 therethrough, the segments being arranged in series so as to abut adjacent segments in such a way that the opening 28 through each segment is in communication with the openings 28 through each of the said adjacent segments. In this way, a passage is provided the length of the conduit 10 to contain a transmission line, the transmission line being of any suitable form.

In a further embodiment of the present invention, the opening 28 through each segment is flared at opposite ends so as to create larger entrances with which the openings of adjacent segments may be in communication. As a result, the degree of flexure in the conduit may be increased; that is, the bend radius may be decreased while maintaining the openings through adjacent segments in communication with each other and the passage created thereby of sufficient minimum cross-section to contain a transmission line.

Yet a further embodiment of the present invention is shown in FIG. 2 wherein a plurality of segments 118 which comprise the conduit 10 are of a single configuration. As in the first embodiment, described above, the segments 118 are arranged in series and caused to abut adjacent segments in such a way that the opening 28 through each segment 118 is in communication with the openings through each of the adjacent segments. In contrast to the previous embodiment, however, each segment is provided with a convex arcuate surface 30 and a concave arcuate surface 32, each arcuate surface being of substantially similar radius of curvature so that the convex arcuate surface 30 of one segment may be received by the concave arcuate surface 32 of an adjacent segment.

Returning to the first embodiment described above, each segment 18a and 18b flexibly linked to its ajacent segments by coupling means. As may be most clearly seen in FIG. 3, the coupling means may comprise a pair of flexible ligaments 34 running throughout the length of the conduit 10 and passing through each segment in turn. The flexible ligaments 34 may be terminated by variable tensioning means (not shown) at the terminations of the conduit 10, and preferably tensioned to approximately 133 Newtons (30 lbs. force).

In the embodiment of the flexible housing shown in FIG. 1 and in the embodiments of the conduit segments shown in FIGS. 4 to 7, the flexible ligaments 34 are shown passing through each conduit segment at a distance away from the through axis of the opening 28 of the said segment. That is, the plane defined by the passage of the two flexible ligaments 34 through a conduit segment does not contain the through axis of the opening 28 of that segment so that the tension in the flexible ligaments acts at a distance from the said through axis. The effect of a force acting off center of the natural axis of the segments is, in the regions of the conduit 10 away from the point of flexure, to lock the butting edges 38 of the segments of biconcave cross-section 18a against each other. This results in these regions being urged to maintain a straight disposition without recourse to a more elaborate conduit management system analogous to the cable management systems of the prior art. Within the region of the point of flexure, the butting edges 38 open out to allow a smoothly curving flexure through 180°, the position of the point of flexure being dependent upon the relative heights of the terminations of the conduit.

Owing to the design of the conduit, the flexible housing is only capable of flexure in one plane. In a further embodiment of the present invention, the housing is additionally urged to maintain a planar disposition by providing the arcuate surface of one conduit segment with guide surfaces while the arcuate surface of the adjacent conduit segment abutting thereagainst is provided with means to cooperate with the guide surfaces to prevent relative lateral movement between the segments. The guide surfaces and cooperating means may be of any convenient design, for example, a ridge on the lateral edges of one segment received in grooves of the adjacent segment. In the embodiments shown in FIGS. 4 to 7, the guide surfaces are in the form of a 45° radial abutment 40 while the means cooperating therewith is a 45° radial chamfer 42. In the embodiments shown, the radial abutment is applied to the segment of biconcave cross-section and the radial chamfer is applied to the segment of circular cross-section, although it is understood that these features may be applied in the opposite sense.

The conduit is enclosed within an inner sleeve 14, preferably of shrink-fit material which is in turn contained within an outer protective jacket 16. The material of the outer protective jacket is dependent upon the application of the housing and the characteristics of the environment against which it is to offer protection but may typically be of extruded polyurethane. The material of the inner sleeve is selected to have similar thermal expansion properties to those of the outer protective jacket as well as having a low coefficient of friction and some elastic properties. The preferred material for the inner sleeve 14 is expanded polytetrafluoroethylene. The inner sleeve 14 prevents the adherence of the outer protective jacket 16 to the assembled conduit segments thus allowing the movement of the outer protective jacket 16 over the conduit segments during flexure. The inner sleeve 14 is itself prevented from being pinched between abutting segments during flexure and, in particular, between the abutting edges 38 of the segments of biconcave cross-section 18a by a strip 44, preferably of nylon, the length of the conduit placed between the inner sleeve 14 and the conduit 10. Conduit segments 18a, 18b and 118 may be of an acetal resin such as Delrin ® resin. Flexible ligaments 34 may be of stainless steel or an aromatic polyamide fiber such as Kevlar ® fiber.

While the invention has been disclosed herein in connection with certain embodiments and detailed descriptions, it will be clear to one skilled in the art that modifications or vibrations of such details can be made without deviating from the gist of this invention, and such modifications or variations are considered to be within the scope of the claims hereinbelow.

What is claimed is:

1. A flexible housing for use in protecting a transmission line in a pressurized environment comprising a conduit contained within a protective outer jacket, the conduit being constructed of a plurality of conduit segments, each conduit segment having an opening therethrough, the segments being arranged in series and caused to abut adjacent segments in such a way that the opening through each segment is in communication with the openings through each of said adjacent segments so as to provide a passage to contain a transmission line, each segment being flexibly linked to its adjacent segments by coupling means, wherein the abutting surface of one conduit segment is provided with guide surfaces and the surface of an adjacent conduit segment abutting thereagainst is provided with means cooperating with said guide surfaces to prevent relative lateral movement between the segments.

2. A flexible housing in accordance with claim 1 wherein the coupling means comprises a pair of flexible ligaments running throughout the length of the conduit and passing through each conduit segment in turn.

3. A flexible housing in accordance with claim 2 wherein the pair of flexible ligaments comprising the coupling means pass through each conduit segment defining a plane that does not contain the through axis of the opening in said conduit segment so that a tension generated by the pair of ligaments acts at a distance away from said through axis.

4. A flexible housing in accordance with claim 2 wherein the flexible ligaments are tensioned to approximately 133 Newtons (30 lbs. force).

5. A flexible housing in accordance with claim 1 wherein the abutment of adjacent conduit segments in such that a convex arcuate surface of one segment is received by a concave arcuate surface of an adjacent segment of corresponding curvature.

6. A flexible housing in accordance with claim 5 wherein the plurality of segments which comprise the conduit are of two different configurations, the configurations alternating along the length of the flexible housing, the first segment configuration being a segment of biconcave cross-section and the second segment configuration being of circular cross-section, the cross-sectional radius of curvature of the second configuration being substantially equal to the cross-sectional radius of curvature of the first configuration so that the second configuration may be received thereby.

7. A flexible housing in accordance with claim 1 wherein said protective outer jacket is of extruded polyurethane.

8. A flexible housing in accordance with claim 1 wherein the guide surfaces are 45° radial abutments and the means cooperating therewith are 45° radial chamfers.

9. A flexible housing in accordance with claim 1 wherein the opening through each conduit segment is flared at opposite ends.

10. A flexible housing in accordance with claim 1 wherein an inner sleeve is provided between the plurality of conduit segments and said protective outer jacket to prevent the adhesion of the jacket to the conduit segments.

11. A flexible housing in accordance with claim 10 wherein the conduit is provided with a nylon strip to prevent the pinching of the inner sleeve between abutting surfaces during any relative movement of adjacent conduit segments.

* * * * *